US012785941B2

(12) United States Patent
Dillon et al.

(10) Patent No.: US 12,785,941 B2
(45) Date of Patent: Nov. 3, 2026

(54) SECURING MESSAGES FOR SUBMISSION GROUPS

(71) Applicant: SENTRIQS, INC., Savannah, GA (US)

(72) Inventors: Paul Dillon, Erie, PA (US); Damien Fortune, Savannah, GA (US)

(73) Assignee: Sentriqs, Inc., Savannah, GA (US)

( * ) Notice: Subject to any disclaimer, the term of this patent is extended or adjusted under 35 U.S.C. 154(b) by 42 days.

(21) Appl. No.: 19/057,828

(22) Filed: Feb. 19, 2025

(65) Prior Publication Data

US 2026/0246618 A1 Aug. 20, 2026

(51) Int. Cl.
*H04L 9/08* (2006.01)

(52) U.S. Cl.
CPC .......... *H04L 9/0825* (2013.01); *H04L 9/0861* (2013.01)

(58) Field of Classification Search
CPC ............................ H04L 9/0825; H04L 9/0861
See application file for complete search history.

(56) References Cited

U.S. PATENT DOCUMENTS

2020/0045022 A1* 2/2020 Liu ....................... H04L 63/123
2021/0374265 A1* 12/2021 Gigov ................... H04L 63/102
2022/0086112 A1* 3/2022 Wunderlich .......... H04L 51/212
2024/0169350 A1* 5/2024 Fiske .................... H04L 9/0643

* cited by examiner

*Primary Examiner* — Andrew Suh
(74) *Attorney, Agent, or Firm* — Ashurst Perkins Coie US LLP

(57) ABSTRACT

Systems and methods are described that enable creation and use of submission groups. A submission group may be created, or a regular group may be modified into a submission group. When an encrypted message is sent to the submission group, the encrypted message is received by a server and only forwarded to the administrators of the submission group that are able to decrypt the message using a private key that is derived from a special secret generated during group creation.

18 Claims, 6 Drawing Sheets

500

200

203 206 209

| Group ID | Group Type | Parameter 1 |
|---|---|---|
| abc | Reg | Value_1 |
| def | Sub | Value_2 |
| ghi | Reg | Value_2 |

FIG. 2

300

303 306 309

| User ID | User Type | Parameter 1 |
| --- | --- | --- |
| User_1 | member | Value_1 |
| User_2 | Administrator | Value_2 |
| User_3 | Administrator | Value_2 |

FIG. 3

SECURING MESSAGES FOR SUBMISSION GROUPS

BACKGROUND

Many messaging applications exist that enable users to communicate via the Internet. Those messaging applications include an ability to communicate with a single person and a group of people. Furthermore, those applications employ various encryption technologies to enable secure communications both for usage for person-to-person communications and person-to-group communications. Some applications use Message Layer Security (MLS) encryption to perform encryption on person-to-group communications. MLS enables encryption of person-to-group communications. However, the MLS protocol is unable to handle special groups such as submission groups. Therefore, a mechanism is required to implement end-to-end encryption for submission groups.

SUMMARY

To address these and other issues, an end-to-end mechanism is disclosed herein for transporting encrypted messages sent to recipients of a submission group. A submission group may be a special type of user group that enables members (or, in some instances, non-members) to submit messages to the group. The messages are sent exclusively to the administrators of the group and not to every member. In particular, the disclosed mechanism enables creation and use of submission groups. A submission group may be created, or a regular group may be modified into a submission group. When an encrypted message is sent to the submission group, the encrypted message is received by a server and only forwarded to the administrators of the submission group that are able to decrypt the message using a private key that is derived from a special secret generated during group creation or during various group maintenance operations.

A message processing system may be used to perform the operations disclosed here. The message processing system may reside on a combination of a client device and server. In some embodiments, the portion of the message processing system residing on the client device may be an application executed within a web browser that uses, for example, a JavaScript Runtime Environment for executing message processing system operations.

As discussed above, the message processing system may include a server component. The message processing system may receive, at a server from a client device associated with a user, an encrypted message addressed to a user group. The user group may include a multitude of members. For example, the server may be hosting all the groups and may receive encrypted messages from client devices addressed to those groups. The client device may use a web browser or a dedicated application to send the messages to the server. The message may be encrypted (as will be described below) such that the server is unable to decrypt the messages and only specific client devices may decrypt those messages.

The message processing system may then identify a type of group that is the recipient of the encrypted message. In particular, the message processing system may determine, based on an identifier of the user group received with the encrypted message, that the user group is a submission group. As discussed above, a submission group is a group where only administrators receive messages without other members of the user group receiving each message. For example, the message processing system may perform a group lookup upon receiving an encrypted message. The group lookup may be performed using a group identifier which may be received together with the encrypted message. Each submission group may be flagged as such, and based on the flag, the message processing system may determine that a particular group is a submission group.

Upon determining that a particular encrypted message is directed to a submission group, the message processing system may identify administrators of the group for message transmission. In particular, the message processing system may, based on determining that the user group is the submission group, retrieve, from a data structure storing member identifiers of the plurality of members of the user group, a plurality of administrator identifiers corresponding to a plurality of administrators of the user group. In some embodiments, the plurality of administrators of the user group may be a subset of the plurality of members of the user group. That is, the administrators may also be members of the user group. For example, group membership may be accessible to the server, thus, the message processing system may retrieve group membership (e.g., identifier of the members) and determine (e.g., based on a flag within the member entry) whether a member is an administrator.

The message processing system may then identify client devices belonging to the administrators for message transmission. In particular, the message processing system may determine, based on the plurality of administrator identifiers, a plurality of administrator devices associated with the plurality of administrators. For example, the message processing system may perform a lookup to identify, for each administrator, one or more client devices that are registered to each administrator.

The message processing system may then transmit the encrypted message to the plurality of administrator devices without transmitting the encrypted message to the other members of the user group. In some embodiments, each administrator device may store a binary tree associated with the user group. Together with the binary tree, the client device may store a private key derived from a special secret. The binary tree and the special secret may be derived from a master secret. Thus, each administrator device may decrypt the encrypted message using that private key.

The message processing system may also create submission groups based on a request from a user. In particular, the message processing system may receive, at a client device, a request to generate a submission group. As discussed above, the submission group may be a group where administrators of the group receive each message without other members of the submission group receiving each message. For example, a user with a group creation permission or role may request that a submission group is created. The user may specify one or more members of the group in the request. The user may also specify one or more administrators for the group within the request.

The message processing system may then determine a plurality of administrators for the submission group. As discussed above, the administrators may be specified by the user requesting that the group be created. In some embodiments, the message processing system may set the requesting user as an administrator and enable that user to select other administrators or otherwise indicate other administrators for the group. The message processing system may also enable the requesting user to identify group members.

Based on determining the plurality of administrators, the message processing system may generate a data structure for the submission group. The data structure may include a plurality of entries for the plurality of administrators with each entry corresponding to an administrator storing an administrator flag. For example, the group may include a multitude of members with some of the members being administrators. Thus, the message processing system may generate and store that information in a data structure.

The message processing system may also generate a binary tree to represent the group. In particular, the message processing system may generate, based on the data structure, a binary tree for the submission group. The binary tree may include (1) a plurality of administrator identifiers of the plurality of administrators within the submission group and (2) a plurality of key generation secrets. Each key generation secret may be the last generated key generation secret for a corresponding administrator. For example, the message processing system may generate the binary tree to be stored in memory and may manipulate the binary tree based on required operations of the group (e.g., send message, receive message, etc.).

The message processing system may also generate a private/public key pair for decrypting messages sent to the submission group. In particular, the message processing system may derive, from a master secret, a submission secret for the submission group. The submission secret may then be used to derive a submission public key for encrypting submission group messages and a submission private key for decrypting submission messages. The message processing system may then transmit, to each administrator device, the submission secret for generating the submission public key and the submission private key. Each administrator device may then generate those private and public keys for encrypting and decrypting messages addressed to the submission group.

Various other aspects, features, and advantages of the disclosure will be apparent through the detailed description of the disclosure and the drawings attached hereto. It is also to be understood that both the foregoing general description and the following detailed description are examples and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 2 illustrates an excerpt of a data structure for storing group information, in accordance with some embodiments of this disclosure.

FIG. 3 illustrates an excerpt of a data structure for storing indicators for members of the group, in accordance with some embodiments of this disclosure.

DETAILED DESCRIPTION

In the following description, for the purposes of explanation, numerous specific details are set forth in order to provide a thorough understanding of the disclosure. It will be appreciated, however, by those having skill in the art, that the disclosure may be practiced without these specific details or with an equivalent arrangement. In other cases, well-known structures and devices are shown in block diagram form to avoid unnecessarily obscuring the disclosure.

Figure 1:
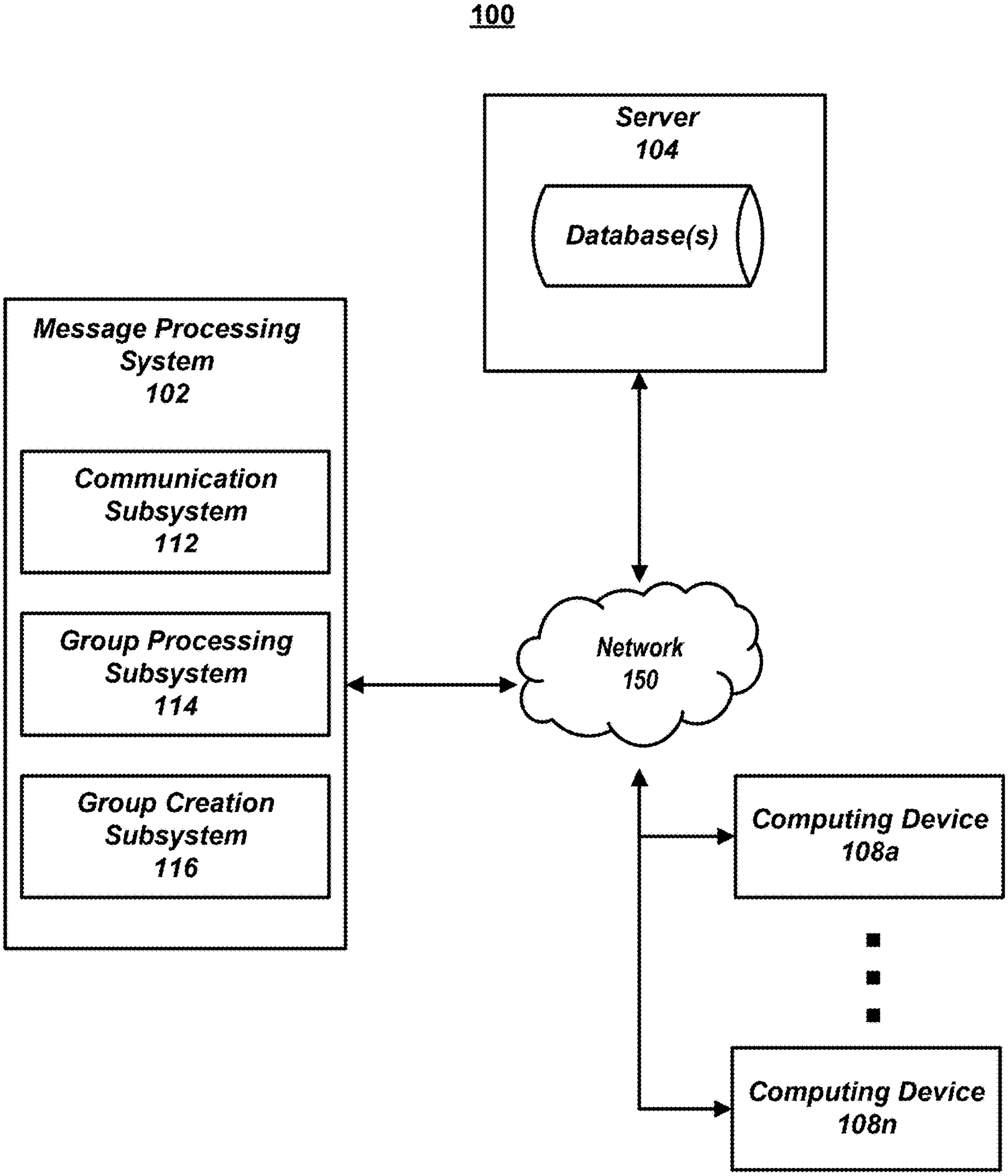
FIG. 1 illustrates an example computing environment for implementing submission groups in accordance with some embodiments of this disclosure.

FIG. 1 shows an example environment 100 for transporting encrypted messages using submission groups. Environment 100 includes message processing system 102, server 104, and computing devices 108*a*-108*n*. Message processing system 102 may execute instructions for transporting encrypted messages and managing submission groups. Message processing system 102 may include software, hardware, or a combination of the two. For example, message processing system 102 may be a physical computing device or a virtual computing device that is running on a physical computing device. Message processing system 102 may be hosted on a personal computer, a smartphone, a laptop computing device, an electronic tablet, or another suitable computing device. In some embodiments, message processing system 102 may be hosted on a cloud computing device and may be accessed by a thin client. Some components of message processing system 102 may be hosted on a server device (e.g., server 104). Message processing system 102 may include communication subsystem 112, group processing subsystem 114, and group creation subsystem 116. Message processing system 102 may include other components (e.g., as described in FIG. 4).

Communication subsystem 112 may include software components, hardware components, or a combination of both. For example, communication subsystem 112 may include a network card (e.g., a wireless network card and/or a wired network card) that is coupled with software to drive the card. Group processing subsystem 114 may include software components, hardware components, or a combination of both. For example, group processing subsystem 114 may include software components that access data in memory and/or storage and may use one or more processors to perform its operations. Group creation subsystem 116 may include software components, hardware components, or a combination of both. For example, group creation subsystem 116 may include software components that access data in memory and/or storage and may use one or more processors to perform its operations.

Server 104 may host server components associated with message processing system 102 as well as other server components. In some embodiments, server 104 may host server-side components for multiple applications while those applications may have a client-side component that is executed on a client device (e.g., message processing system 102 and/or computing devices 108*a*-108*n*). Server 104 may include software, hardware, or a combination of the two. For example, server 104 may be a physical server or a virtual server that is running on a physical computer system. Network 150 may be a local area network, a wide area network (e.g., the Internet), or a combination of the two. Computing devices 108*a*-108*n* may include components similar to components of message processing system 102.

The operations described below may use the following concepts related to encryption of group messages. In an established group, each group member may maintain (e.g., within a web browser or another type of storage) cryptographic information needed to (1) encrypt its own messages and (2) decrypt the messages received from other group members. The encryption mechanism may employ a traditional symmetric key encryption algorithm, which may require the sender and receiver(s) to have access to a common, single shared key that may be an input to the encryption and decryption processes. Several mechanisms may be used to safely and securely distribute to all group members the data for establishing the set of shared keys that may be employed when invoking the symmetric key encryption.

The first mechanism may involve a concept referred to as a "ratchet." As referred to herein, the term ratchet refers to a mechanism that takes one secret (e.g., a key generation secret) as input and deterministically produces two outputs: (1) a secret to be used with the symmetric key encryption algorithm (e.g., an encryption/decryption key) and (2) a secret intended to be cycled back as the next input to the ratchet mechanism (the new key generation secret). With this mechanism, a sender and each recipient may exchange an initial shared secret to be used as the first input to their respective copies of a ratchet and then each independently produce the same sequence of shared secrets, where the sender may utilize one output from the ratchet to produce an encrypted message and the recipient may utilize that output to decrypt the message before they both discard the secret and move on to the next secret in the sequence.

Each group member may maintain a set of ratchets, assigning one to each group member such that the assigned ratchet may be utilized when the corresponding group member sends a message. In this way, the system may ensure that each member receives the initial shared secret for each of the ratchets in the group.

To that end, the second mechanism may employ a binary tree structure that allows for the efficient computation of these initial secrets. In some embodiments, within the binary tree structure, the ratchets may be arranged for the group members as leaves of the tree. Then, starting with an initial, single input secret (e.g., key generation secret) assigned to the root of the tree, the message processing system may deterministically derive secrets to assign to each of the root's children in a fashion similar to the derivation made by a ratchet. This process may then be repeated with the children of the root's children down the tree until a unique secret (e.g., key generation secret) is assigned to each of the leaves of the tree. Each unique secret may then serve as the initial input to the ratchet corresponding to the group member at that position in the binary tree. Thus, a single initial secret, the root secret, may be used to derive the set of secrets that initialize the ratchets within the binary tree.

Furthermore, the message processing system may distribute the root secret to all group members without disclosing the secret to any unintended third party, which is achieved utilizing a key exchange or key encapsulation mechanism, but one where the public/private key pair used to secure the root secret is not chosen randomly. Instead, the key pair may also be deterministically derived from other secrets.

A third mechanism may again employ the same binary tree to compute (1) secrets used to derive the root secret and (2) a set of public/private key pairs assigned to the interior nodes of the tree and used to encapsulate these secrets for distribution to other group members. The mechanism may require the binary tree to be unbalanced and left-filled, such that all nodes other than the root have a sibling. With an existing group, a computing device of each group member (e.g., computing devices 108*a*-108*n*) may store the position of its own leaf node in the binary tree and may be in possession of the private keys assigned to the parent of that leaf node and each subsequent parent up to the root node. In addition, each computing device may store its own public/private key pair, assigned to its own leaf node, which may formally identify the member to the group. Each computing device may also be in possession of the public keys assigned to all the nodes in the binary tree.

When one group member initiates an action for which the ratchets may be (re)initialized, the mechanism may utilize a path in the binary tree from the leaf corresponding to this acting group member up to the root. The parent of the leaf in this path, as well as each parent up to the root, may have one inactive child, the child that is not a member of this path. The public key for this inactive child may be used with the key encapsulation algorithm to generate a new secret (e.g., key generation secret) to assign to the parent, or a new secret (e.g., new key generation secret) may randomly be chosen and encrypted with the public key. The message processing system may add the encrypted secret to a message to be distributed to the other group members. The secret may also be used to derive a new public/private key pair to assign to the parent. The secret may also be used as the input to derive an output secret that is assigned to the parent of the parent. The message processing system may repeat the process for each parent in the path using the previous step's output secret to derive the new key pair and next output secret. The final output secret may then be defined as the root secret described above. The result of this mechanism is (1) a message containing a list of novel secrets, each encrypted with a different public key, and (2) a new set of key pairs for the nodes of the tree along this path.

When the message processing system receives the message, another group member may be assured that at least one private key positioned along its path from leaf to root corresponds to one of the public keys used to encrypt the secrets in the message. The message processing system may use this private key to decrypt the corresponding secret, thereby allowing the member to complete the operation, repeatedly deriving secrets and key pairs for nodes in a local copy of the binary tree up to the root. The message processing system may ultimately arrive at the original root secret derived by the sender.

Message processing system 102 may also process encrypted messages addressed to submission groups. As discussed above, a submission group is a special type of group that enables members (or in embodiments, non-members) to send messages to the group such that those messages are only received and decrypted by administrators of the submission group. Messages addressed to the submission group may be processed by group processing subsystem 114, for example, on a server. Submission groups may be created by users using group creation subsystem 116 as will be discussed further in this disclosure.

In some embodiments, message processing system 102 may receive, via communication subsystem 112, an encrypted message addressed to a user group. The user group may include multiple members. In some embodiments, the encrypted message may be received at a server from a client device associated with a user. In some embodiments, the user may be a member of the group. However, in some embodiments, the user sending the encrypted message may not be a member of the group.

When the encrypted message is received, message processing system 102 may determine whether the message is addressed to a regular group or a submission group. In particular, message processing system 102 may determine, based on an identifier of the user group received with the encrypted message, that the user group is a submission group. As discussed above, a submission group is a group where administrators of the submission group receive each message without other members of the user group receiving each message. In some embodiments, a submission group may include two sets of users. One set of members may be enabled to send and receive messages (e.g., users similar to administrators discussed above), and another set of members may only be able to send (i.e., submit) messages to the group and not receive those messages.

Message processing system 102 may use the following operations to determine whether a group is a submission group. Message processing system 102 may generate a group lookup request. The group lookup request may include a group identifier. For example, when the encrypted message is sent, the encrypted message may be accompanied by metadata (e.g., in a form of name-value pairs). The metadata may include an identifier of the user group to which the message is addressed. The identifier may be an alphanumeric string, an email address, or another suitable identifier. Thus, message processing system 102 may perform a lookup (e.g., in a database of server 104) for a group entry within the database using the group identifier.

Message processing system 102 may receive a group entry in response to the group lookup request. For example, the group entry may include group information such as group address and other parameters including a group type (e.g., a group type may indicate that a group is a submission group). In some embodiments, the group type may be a parameter or a flag. Thus, message processing system 102 may determine whether the group entry includes a submission group flag.

FIG. 2 illustrates an excerpt of a data structure 200 for storing group information. Data structure 200 may include field 203 that stores group identifiers for the created groups. As discussed in this disclosure, the group identifier may be an alphanumeric string or another suitable identifier. Field 206 stores a group type. For example, one group type may be a regular group, and another group type may be a submission group. Field 209 may store one or more other parameters. For example, field 209 may store an address of the group and/or other suitable parameters.

Based on determining that the user group is a submission group, message processing system 102 may initiate group processing subsystem 114. Group processing subsystem 114 may include software, hardware, or a combination of both. For example, group processing subsystem 114 may include instructions that may be executed by one or more processors with results being stored in memory. Group processing subsystem 114 may, based on determining that the user group is the submission group, retrieve a plurality of administrator identifiers corresponding to a plurality of administrators of the user group. To continue with the example above, the entry associated with the user group retrieved by message processing system 102 may contain indications of the administrators of the group that are to receive the encrypted message. For example, the entry may include a link (e.g., to a table) for retrieving administrator information. In some embodiments, the entry may include user identifiers associated with the administrators.

In some embodiments, group processing subsystem 114 may determine the administrators of the group only if the group is a submission group. In particular, group processing subsystem 114 may, based on determining that the user group is the submission group, retrieve, from a data structure storing member identifiers of the plurality of members of the user group, a plurality of administrator identifiers corresponding to a plurality of administrators of the user group. In some embodiments, the plurality of administrators of the user group may be a subset of the plurality of members of the user group. The data structure may be a database table, a file, or another suitable data structure. Furthermore, as discussed above, the user group may include both administrators (that are enabled to send and receive messages for the group) and regular members (that are only enabled to send messages to the group).

FIG. 3 illustrates an excerpt of a data structure 300 for storing indicators for members of the group. Field 303 may include a user identifier. In some embodiments, data structure 300 may store a user identifier for every user within the group. Field 306 may store a user type as it pertains to the group. Some users may be members while other users may be administrators of the group. Other user types may be used in addition or instead of the user types indicated. For example, user type may be simply a sender (only allowed to send messages to the group) and another user type may be recipient/sender (allowed to send and receive messages). Field 309 may store other parameters associated with the user's status as it related to the particular group.

When group processing subsystem 114 identifies the administrators of the group, group processing subsystem 114 may identify the devices associated with those administrators so that the encrypted message is sent to those devices. In particular, group processing subsystem 114 may determine, based on the plurality of administrator identifiers, a plurality of administrator devices associated with the plurality of administrators. For example, each administrator may include a user entry within the system. Each user entry may include a multitude of parameters associated with a corresponding user. One or more of those fields may include one or more device identifiers associated with devices corresponding to the user. In some embodiments, each user may be limited to one device at a time, while in other embodiments, the user may not be limited to one device at a time. The device identifiers may link to device parameters such as device addresses and/or other parameters to send information to the devices. Thus, group processing subsystem 114 may identify those devices and their parameters.

Once the administrator devices have been identified, group processing subsystem 114 may use communication subsystem 112 to send the encrypted message to those devices. In particular, group processing subsystem 114 may transmit the encrypted message to the plurality of administrator devices without transmitting the encrypted message to the other members of the user group. As discussed above, in some embodiments, the administrator devices may store a binary tree associated with the user group. The binary tree may be used to decrypt the encrypted message by turning a ratchet as discussed above. That is, each member of the group may have a corresponding leaf node within the binary tree, with each leaf node having a corresponding ratchet as described above. When a message is received from a particular user, the client device may "turn the ratchet" so that a new secret may be used to arrive at a decryption key for decrypting the encrypted message.

In some embodiments, each client device may store a submission secret for the user group (e.g., for each user group that is a submission group). Each device of the plurality of administrator devices may decrypt the encrypted message using a private key derived using the submission secret. That is, in this instance, the binary tree is not required to decrypt the encrypted message.

In some embodiments, the client device may use a combination of the binary tree and the submission secret to decrypt encrypted messages. For example, for messages sent by group members, the client device may use the binary tree and a ratchet corresponding to the member to arrive at the new secret and then a decryption key. However, if a message is sent by a non-member of the group, the client device may use a submission secret to arrive at a decryption key. In this instance, the sender's device may perform encryption differently depending on whether the sender is a member of the group or not. If the sender is a member of the group, the encryption operation may use the binary tree to arrive at an encryption key based on the next secret. However, if the sender is not a member, the client device may use a public key derived from the submission secret to encrypt the message.

In certain cases, a member of the group may need to be elevated to an administrator. Group processing subsystem 114 may use the following actions to perform this operation. Group processing subsystem 114 may receive an indication that a first user of a first group is to be elevated to a group administrator. For example, another administrative user may wish to promote a member to an administrator status so that the member is able to receive submission group messages. The group administrator may submit the request through an application on the client device.

Group processing subsystem 114 may identify an entry associated with the first user within a data structure storing member identifiers of the plurality of members of the first group. For example, as shown in FIG. 3, the user group may be associated with a member table (or another suitable data structure) where the member table may store user identifiers representing the members of the group, a user type of each member (e.g., administrator or member), and/or other parameters. Group processing subsystem 114 may then add an administrator flag to the entry associated with the first user. In some embodiments, group processing subsystem 114 may modify the entry for that member within the group data structure to reflect the change (e.g., member to administrator).

The system may then need to perform a group update (e.g., as described above). Thus, group processing subsystem 114 may generate an initial secret for a group update and a new submission secret. For example, the initial secret may be used to walk down the binary tree and generate other secrets taking the new administrator into account. Group processing subsystem 114 may then transmit to the plurality of administrator devices within the first group a command to update the first group. As discussed above, the command may include the indication of the first user and the initial secret. In some embodiments, group processing subsystem 114 may also transmit a new submission secret. In this instance, because the new user is marked as an administrator, the user may receive the full binary tree and/or the new submission secret.

In some embodiments, a regular group may be transformed into a submission group. Group processing subsystem 114 may use the following operations to perform the transformation. Group processing subsystem 114 may receive a request to transform a second group into the submission group. The request may be received by a server from a client device associated with an administrator of the group. Group processing subsystem 114 may then generate a submission secret for the group. The submission secret may then be used (e.g., by administrator devices) to generate a private key and a public key. The private key may be used to decrypt messages with the public key and the public key may be published to be used for encrypting messages (e.g., by members or non-members of the group).

Group processing subsystem 114 may then determine a second plurality of administrators associated with the second group. For example, the requesting administrator may specify other members to be elevated to an administrator. In another example, only the requesting administrator may be set up as an administrator with the submission group with the other administrator to be elevated at a later time (e.g., as described above). Group processing subsystem 114 may then retrieve a plurality of identifiers for a plurality of devices associated with the second plurality of administrators. For example, group processing subsystem 114 may determine (e.g., based on the request from the group creator) user identifiers for the user that should be administrators of the group. Group processing subsystem 114 may then generate a data structure (e.g., a table) with the members of the group (e.g., as shown in FIG. 3). In some embodiments, the submission group may have a data structure that stores a member list with some members being administrators (e.g., members that receive messages) and some members being regular members (e.g., those members that do not receive messages). In some embodiments, the data structure may only store administrators and not other members.

Once the administrator devices have been identified, group processing subsystem 114 may transmit, to each device of the plurality of devices, a command to update the second group into the submission group using the submission secret. For example, if the submission group uses a submission secret to generate a private/public key pair to decrypt/encrypt messages for the submission group, the command may include the submission secret. However, if the submission group uses the ratchets (e.g., as described above) associated with the members of the group, the submission secret may not be necessary and group processing subsystem 114 may use the ratchets (as described above) to encrypt/decrypt messages for the submission group.

In some embodiments, only members of the submission group may be allowed to submit messages to the submission group. However, in other embodiments, non-members of the submission group may be allowed to submit messages to the submission group. Thus, group processing subsystem 114 may determine whether the user that sent the encrypted message is a member of the submission group. Group processing subsystem 114 may perform a user lookup (e.g., in a database) to determine whether a user with a particular user identifier exists within a database. Group processing subsystem 114 upon determining that the user exists, determines whether the user is a member of the submission group. For example, group processing subsystem 114 may access a group table (e.g., as shown in FIG. 3) and determine whether the user identifier of the sender matches a user identifier with the group table. Based on determining that the user that sent the encrypted message is not the member of the submission group, group processing subsystem 114 may refrain from sending the encrypted message to the plurality of administrators of the submission group. That is, group processing subsystem 114 may simply drop the message.

In some embodiments, group processing subsystem 114 may, instead of refraining from sending messages from non-members, flag the message as from a non-member but still pass it on to the administrators. That is, group processing subsystem 114 may, based on determining that the encrypted message was sent by a non-member of the submission group, flag the encrypted message to indicate that the encrypted message was sent by the non-member. Group processing subsystem 114 may then transmit the message to the administrators of the submission group.

In some embodiments, message processing system 102 may enable creation of submission groups via, for example, group creation subsystem 116. Group creation subsystem 116 may include software, hardware, or a combination of both. In some embodiments, the submission group may be created using a mechanism similar to creating a regular group (e.g., as discussed above). Group creation subsystem 116 may generate a master secret from which each client device may generate a binary tree for the group using other secrets derived from the master secret. Each user or device may be associated with a leaf node on the binary tree which may have a corresponding ratchet that is "turned" in order to get the next secret for encrypting or decrypting messages (as described above). A ratchet may be an algorithm that takes, as input, the last derived secret and outputs the next secret so that the next secret may be used to generate an encryption key or a decryption key. The binary tree may be used when a message is sent by a member of the group to decrypt the message that was encrypted using the binary tree (e.g., a ratchet associated with the user). In some embodiments, when non-members would like to submit messages to the submission group, they may use a submission public key to encrypt the message which is then decrypted by the submission private key at a client device.

Thus, group creation subsystem 116 may use the following operations to create a submission group. Group creation subsystem 116 may reside, at least partly, on a client device associated with a user of the system. Group creation subsystem 116 may receive, at a client device, a request to generate a submission group. As discussed above, the submission group may be a group where administrators of the group receive each message without other members of the submission group receiving each message. The request may be a message to the server.

Group creation subsystem 116 may determine a plurality of administrators for the submission group. As discussed above, the user that is creating the group may select administrators of the group (e.g., based on users available on the server). In some embodiments, during group creation, the creator account may be the first and only administrator for the group and may add other administrators to the group at a later point. In some embodiments, the group creator may also select the members of the group. When creating the group, the creator may be given access to user identifiers and/or other user information enabling the creator to select members of the group and also administrators for the group. Thus, group creation subsystem 116 may retrieve, from the server, a user list containing all the users of the server which may be added to the submission group as a member or an administrator.

In some embodiments, determining the plurality of administrators for the submission group may include receiving corresponding node data for a plurality of nodes that is to be generated for the binary tree. Each node may be associated with the corresponding administrator. For example, node data may include an identifier associated with an administrator such as a user identifier. Thus, group creation subsystem 116 may receive that data and use, for example, user identifiers for the administrators for generating the nodes (e.g., leaf nodes) for the binary tree.

Based on determining the plurality of administrators, a data structure is caused to be generated for the submission group. The data structure may include a plurality of entries for the plurality of administrators with each entry corresponding to an administrator and storing an administrator flag. For example, the data structure may be a data structure shown in FIG. 3. In some embodiments, the data structure may include only administrators. However, in some embodiments, the data structure may also include regular members (e.g., as shown in FIG. 3.). The data structure may have a parameter indicating whether each user is a member or an administrator of the group. In some embodiments, the data structure for the submission group may be generated on the requestor's client device and sent to the server. Yet in some embodiments, the data structure may be generated on the server.

As discussed above, group creation subsystem 116 may generate a binary tree for the group. In particular, group creation subsystem 116 may generate, based on the data structure, a binary tree for the submission group. The binary tree may include a plurality of administrator identifiers of the plurality of administrators within the submission group. That is, the binary tree may include a plurality of leaf nodes corresponding to the administrators of the group. In some embodiments, the leaf nodes may only be generated for the administrators of the group. However, in some embodiments, leaf nodes may be created for all members of the group. Furthermore, the binary tree may include a plurality of key generation secrets, such that each key generation secret of the plurality of key generation secrets is a last generated key generation secret for a corresponding administrator. This operation may be performed in the same manner as described above (e.g., using a master secret to derive all other secrets for the binary tree). In some embodiments, the master secret may be transmitted (e.g., via the server) to group member devices for generating the leaf nodes (e.g., for corresponding administrator identifiers) and the plurality of key generation secrets.

In some embodiments, in addition to the binary tree or instead of the binary tree, group creation subsystem 116 may generate a submission secret for encrypting and decrypting messages to the submission group. In particular, group creation subsystem 116 may derive, from a master secret, a submission secret for the submission group. The submission secret may be used to derive a submission public key for encrypting submission group messages and a submission private key for decrypting submission messages. In some embodiments, the submission private key and the submission public key may be used together with the binary tree. For example, when a message is received from the member of the group, the binary tree may be used (e.g., using the ratchets) to encrypt and decrypt the message. Furthermore, if the message is received from a non-member of the group, the submission public key may be used to encrypt the message and the submission private key may be used to decrypt the message. Thus, the submission public key may be published/advertised with the group. Thus, group creation subsystem 116 may then transmit, to each administrator device, the submission secret for generating the submission public key and the submission private key.

Group processing subsystem 114 may use the following operations to decrypt messages using submission group keys. Part of group processing subsystem 114 may reside on a client device. Thus, group processing subsystem 114 may receive an encrypted message, and determine, based on metadata received with the encrypted message, that the encrypted message is addressed to the submission group. For example, as discussed above, group processing subsystem 114 may use name-value pairs received with the message to retrieve a group identifier and compare the group identifier with existing groups. Thus, group processing subsystem 114 may retrieve an entry associated with the submission group.

Group processing subsystem 114 may then identify a submission private key associated with the group. In particular, group processing subsystem 114 may determine, based on an identifier of the submission group, the submission private key for the submission group. For example, message processing system 102 may be storing a multitude of submission private keys for different submission groups. Each submission private key may be stored in association with an identifier of a corresponding submission group. Accordingly, group processing subsystem 114 may identify the correct private key based on the identifier. Group processing subsystem 114 may then decrypt the encrypted message using the submission private key.

In some embodiments, group creation subsystem 116 may then generate a submission secret for the submission group. In particular, group creation subsystem 116 may derive, from a master secret, a submission secret for the submission group. The submission secret may be used to derive a submission public key for encrypting submission group messages and a submission private key for decrypting submission group messages. For example, the submission secret may be an alphanumeric string that may be used as a seed for key generation.

Group creation subsystem 116 may then transmit, to each administrator device, the submission secret for generating the submission public key and the submission private key. The client device may then use an asymmetric key generation algorithm to generate the submission public key and the submission private key using the submission secret as the seed.

In some embodiments, when the group is created and the submission public key and the submission private keys have been generated, the submission public key may be published so that members of the group and, in some embodiments, non-members are able to encrypt messages for the submission group. Thus, to send a message, a client device may perform the following operations. The client device may receive, from a user operating the client device, an input for sending a message. For example, the message may be an alphanumeric string with spaces. The client device may determine, based on a group identifier associated with a recipient group, that the message is to be addressed to the submission group. For example, the client device may store submission public keys for all the submissions groups in which the corresponding user is a member.

The client device may then use a group identifier to find the matching submission public key. Thus, the client device may determine, based on an identifier of the submission group, the submission public key for the submission group and encrypt the message using the submission public key for transmission to a server. The server may then forward the message to each administrator device that is able to decrypt the message using the submission private key.

Figure 4:
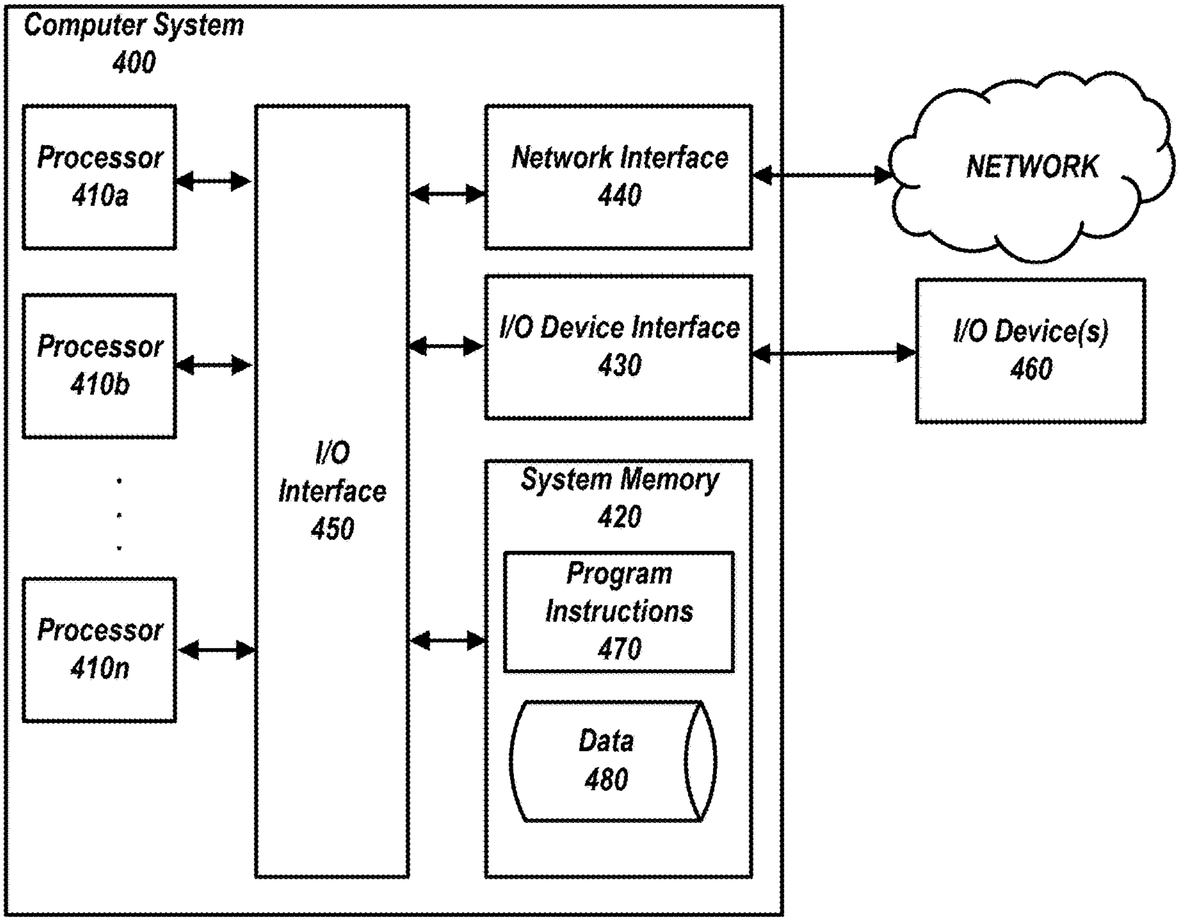
FIG. 4 shows an example computing system that may be used in accordance with some embodiments of this disclosure.

FIG. 4 is a diagram that illustrates an exemplary computing system 400 in accordance with embodiments of the present technique. Various portions of systems and methods described herein may include or be executed on one or more computer systems similar to computing system 400. Further, processes and modules described herein may be executed by one or more processing systems similar to that of computing system 400.

Computing system 400 may include one or more processors (e.g., processors 410*a*-410*n*) coupled to system memory 420, an input/output (I/O) device interface 430, and a network interface 440 via an input/output (I/O) interface 450. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 400. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 420). Computing system 400 may be a units-processor system including one processor (e.g., processor 410*a*), or a multi-processor system including any number of suitable processors (e.g., 410*a*-410*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 400 may include a plurality of computing devices (e.g., distributed computer systems) to implement various processing functions.

I/O device interface 430 may provide an interface for connection of one or more I/O devices 460 to computing system 400. I/O devices may include devices that receive input (e.g., from a user) or output information (e.g., to a user). I/O devices 460 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 460 may be connected to computing system 400 through a wired or wireless connection. I/O devices 460 may be connected to computing system 400 from a remote location. I/O devices 460 located on a remote computer system, for example, may be connected to computing system 400 via a network and network interface 440.

Network interface 440 may include a network adapter that provides for connection of computing system 400 to a network. Network interface 440 may facilitate data exchange between computing system 400 and other devices connected to the network. Network interface 440 may support wired or wireless communication. The network may include an electronic communication network, such as the Internet, a local area network (LAN), a wide area network (WAN), a cellular communications network, or the like.

System memory 420 may be configured to store program instructions 470 or data 480. Program instructions 470 may be executable by a processor (e.g., one or more of processors 410*a*-410*n*) to implement one or more embodiments of the present techniques. Program instructions 470 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 420 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. Non-transitory, computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 420 may include a non-transitory, computer-readable storage medium that may have program instructions stored thereon that are executable by a computer processor (e.g., one or more of processors 410*a*-410*n*) to cause the subject matter and the functional operations described herein. A memory (e.g., system memory 420) may include a single memory device and/or a plurality of memory devices (e.g., distributed memory devices).

I/O interface 450 may be configured to coordinate I/O traffic between processors 410*a*-410*n*, system memory 420, network interface 440, I/O devices 460, and/or other peripheral devices. I/O interface 450 may perform protocol, timing, or other data transformations to convert data signals from one component (e.g., system memory 420) into a format suitable for use by another component (e.g., processors 410*a*-410*n*). I/O interface 450 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 400 or multiple computer systems 400 configured to host different portions or instances of embodiments. Multiple computer systems 400 may provide for parallel or sequential processing/execution of one or more portions of the techniques described herein.

Those skilled in the art will appreciate that computing system 400 is merely illustrative and is not intended to limit the scope of the techniques described herein. Computing system 400 may include any combination of devices or software that may perform or otherwise provide for the performance of the techniques described herein. For example, computing system 400 may include or be a combination of a cloud computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 400 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments, some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 400 may be transmitted to computing system 400 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

Figure 5:
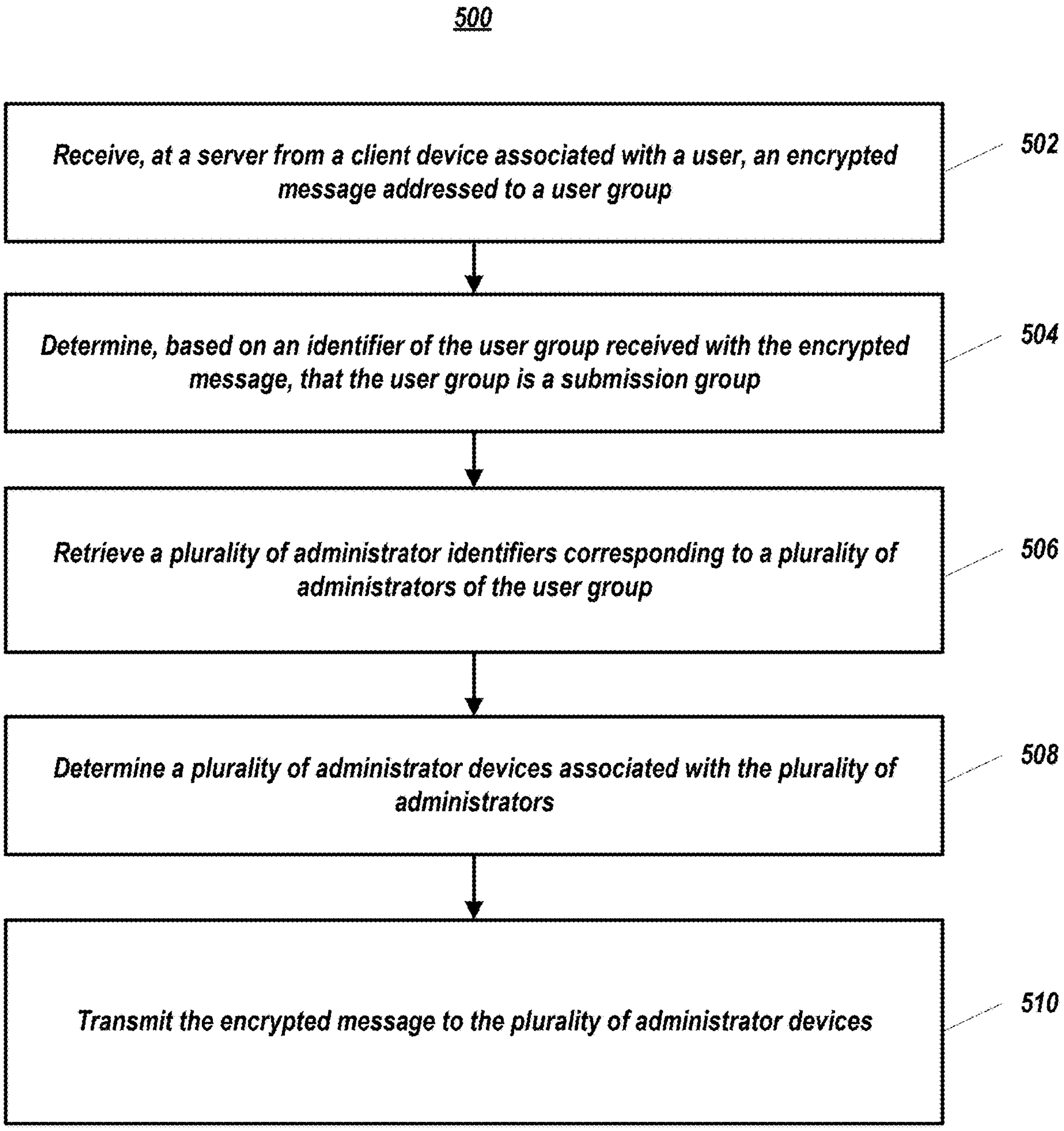
FIG. 5 shows an example flowchart of operations performed for processing submission group messages, in accordance with some embodiments of this disclosure.

FIG. 5 shows an example flowchart 500 for providing end-to-end encryption for submission groups. At 502, message processing system 102 receives, at a server from a client device associated with a user, an encrypted message addressed to a user group. For example, message processing system 102 may be hosted on a computer system 400. Thus, the message may be received via network 150 through network interface 440 (e.g., from a network device) and then passed via I/O interface 450 to system memory 420. At 504, message processing system 102 (e.g., using one or more components of FIG. 1 and/or computing system 400 via one or more processors 410*a*-410*n* and system memory 420 (FIG. 4)) determines, based on an identifier of the user group received with the encrypted message, that the user group is a submission group.

At 506, message processing system 102 (e.g., using one or more components of FIG. 1 and/or computing system 400 via one or more processors 410*a*-410*n*, I/O interface 450, and/or system memory 420 (FIG. 4)) retrieves a plurality of administrator identifiers corresponding to a plurality of administrators of the user group. At 508, message processing system 102 (e.g., using one or more components of FIG. 1 and/or computing system 400 via one or more processors 410*a*-410*n* (FIG. 4)) determines a plurality of administrator devices associated with the plurality of administrators. At 510, message processing system 102 (e.g., using one or more components of FIG. 1 and/or computing system 400 (FIG. 4)) transmits the encrypted message to the plurality of administrator devices.

Figure 6:
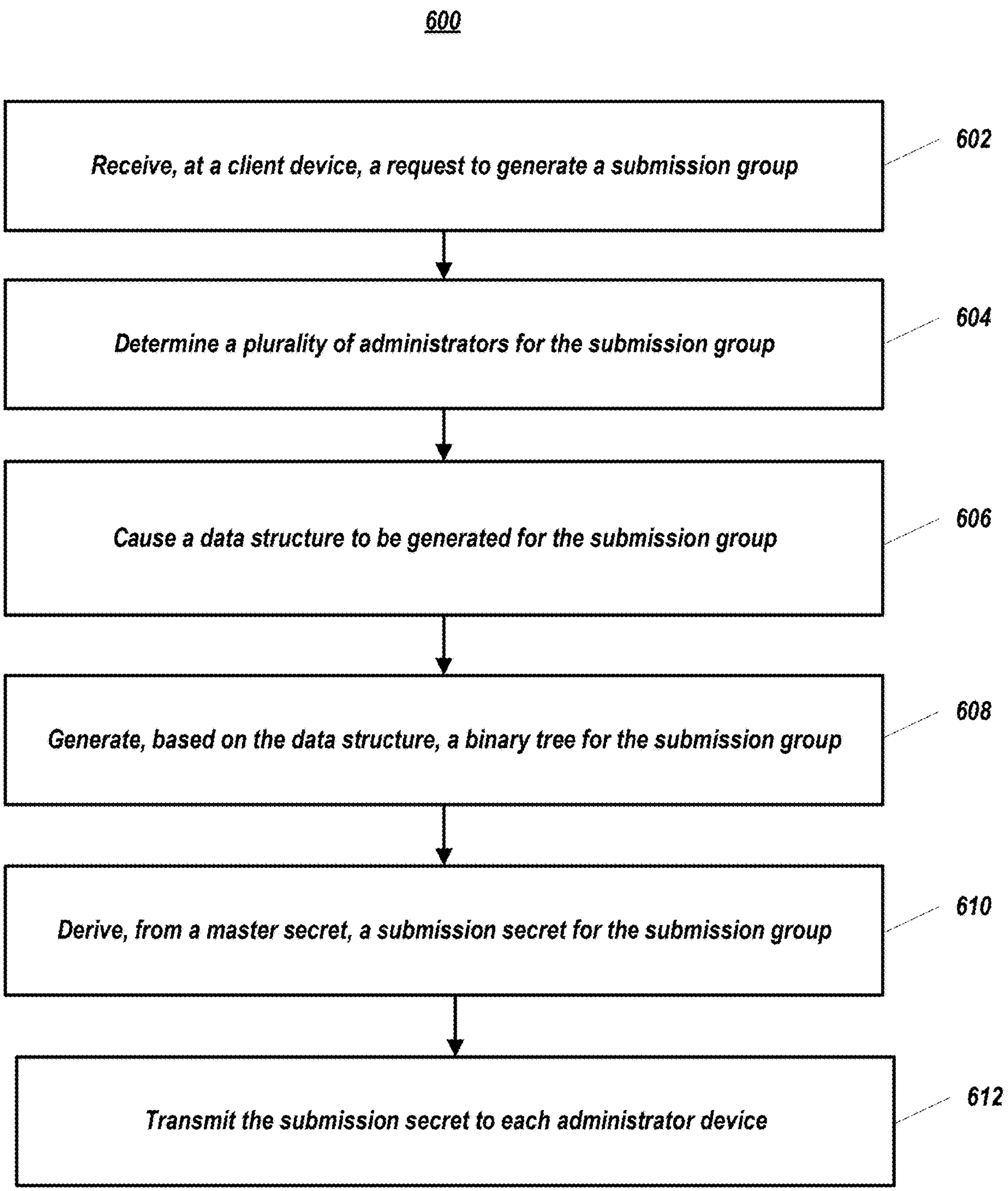
FIG. 6 shows an example flowchart of operations performed for creating a submission group, in accordance with some embodiments of this disclosure.

FIG. 6 shows an example flowchart 600 of the actions involved in creating a submission group. At 602, message processing system 102 (e.g., using one or more components of computing system 400 via one or more processors 410*a*-410*n* (FIG. 4)) receives, at a client device, a request to generate a submission group. At 604, message processing system 102 (e.g., using one or more components of computing system 400 via one or more processors 410*a*-410*n* (FIG. 4)), determines a plurality of administrators for the submission group. At 606, message processing system 102 (e.g., using one or more components of computing system 400 via one or more processors 410*a*-410*n* (FIG. 4)), causes a data structure to be generated for the submission group. At 608, message processing system 102 (e.g., using one or more components of computing system 400 via one or more processors 410*a*-410*n* (FIG. 4)), generates, based on the data structure, a binary tree for the submission group. At 610, message processing system 102 (e.g., using one or more components of computing system 400 via one or more processors 410*a*-410*n* (FIG. 4)), derives, from a master secret, a submission secret for the submission group. At 612, message processing system 102 (e.g., using one or more components of computing system 400 via one or more processors 410*a*-410*n* (FIG. 4)), transmits the submission secret to each administrator device.

It is contemplated that the actions or descriptions of FIG. 5 and FIG. 6 may be used with any other embodiment of this disclosure. In addition, the actions and descriptions described in relation to FIG. 5 and FIG. 6 may be done in alternative orders or in parallel to further the purposes of this disclosure. For example, each of these actions may be performed in any order, in parallel, or simultaneously to reduce lag or increase the speed of the system or method. Furthermore, it should be noted that any of the devices or components discussed in relation to FIGS. 1-4 could be used to perform one or more of the actions in FIG. 5 and/or in FIG. 6.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example, such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, third-party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. But the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to cost constraints, some features disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing actions A, B, C, and D) encompasses both all such attributes or functions being mapped to all such objects and subsets of the attributes or functions being mapped to subsets of the attributes or functions (e.g., both all processors each performing actions A-D, and a case in which processor 1 performs action A, processor 2 performs action B and part of action C, and processor 3 performs part of action C and action D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for providing end-to-end message encryption for submission groups, the method comprising: receiving, at a server from a client device associated with a user, an encrypted message addressed to a user group, wherein the user group comprises a plurality of members; determining, based on an identifier of the user group received with the encrypted message, that the user group is a submission group where administrators of the submission group receive each message without other members of the user group receiving each message; based on determining that the user group is the submission group, retrieving, from a data structure storing member identifiers of the plurality of members of the user group, a plurality of administrator identifiers corresponding to a plurality of administrators of the user group, wherein the plurality of administrators of the user group is a subset of the plurality of members of the user group; determining, based on the plurality of administrator identifiers, a plurality of administrator devices associated with the plurality of administrators; and transmitting the encrypted message to the plurality of administrator devices without transmitting the encrypted message to the other members of the user group, wherein each device of the plurality of administrator devices stores a binary tree associated with the user group together with a private key derived from a submission secret, and wherein each device of the plurality of administrator devices decrypts the encrypted message using the private key.
2. The method of any of prior embodiments, further comprising receiving an indication that the user of the submission group is to be elevated to an administrator; identifying an entry associated with the user within the data structure storing the member identifiers of the plurality of members of the user group; adding a flag to the entry associated with the user; generating an initial secret for a group update of the submission group; and transmitting to the plurality of administrator devices within the user group a command to update the user group, wherein the command comprises the indication of the user.
3. The method of any of prior embodiments, further comprising: receiving a request to transform a first group into a first submission group; generating a group secret, wherein the group secret is used to generate a private key and a public key for the first submission group; determining a plurality of group administrators associated with the first group; retrieving a plurality of identifiers for a plurality of devices associated with the plurality of group administrators of the first group; and transmitting to each device of the plurality of devices a command to update the first group into the first submission group using the group secret.
4. The method of any of prior embodiments, wherein determining whether the user group is the submission group further comprises: generating a group lookup request, wherein the group lookup request comprises a group identifier; receiving a group entry in response to the group lookup request; and determining whether the group entry comprises a submission group flag.
5. The method of any of prior embodiments, further comprising: determining whether the user that sent the encrypted message is a member of the submission group; and based on determining that the user that sent the encrypted message is not the member of the submission group, refraining from sending the encrypted message to the plurality of administrators of the submission group.
6. The method of any of prior embodiments, further comprising, based on determining that the user that sent the encrypted message is a non-member of the submission group, flagging the encrypted message to indicate that the encrypted message was sent by the non-member.
7. A method for creating submission groups, the method comprising: receiving, at a client device, a request to generate a submission group, wherein the submission group is a group where administrators of the group receive each message without other members of the submission group receiving each message; determining a plurality of administrators for the submission group; based on determining the plurality of administrators, causing a data structure to be generated for the submission group, wherein the data structure comprises a plurality of entries for the plurality of administrators with each entry corresponding to an administrator comprising an administrator flag; generating, based on the data structure, a binary tree for the submission group, wherein the binary tree comprises (1) a plurality of administrator identifiers of the plurality of administrators within the submission group and (2) a plurality of key generation secrets, wherein each key generation secret of the plurality of key generation secrets is a last generated key generation secret for a corresponding administrator; deriving, from a master secret, a submission secret for the submission group, wherein the submission secret is used to derive a submission public key for encrypting submission group messages and a submission private key for decrypting submission messages; and transmitting, to each administrator device, the submission secret for generating the submission public key and the submission private key.
8. The method of any of prior embodiments, further comprising: receiving an encrypted message; determining, based on metadata received with the encrypted message, that the encrypted message is addressed to the submission group; determining, based on an identifier of the submission group, the submission private key for the submission group; and decrypting the encrypted message using the submission private key.

9. The method of any of prior embodiments, wherein determining the plurality of administrators for the submission group comprises receiving corresponding node data for a plurality of nodes that is to be generated for the binary tree wherein each node is associated with the corresponding administrator.

10. The method of any of prior embodiments, further comprising: receiving, from a user operating the client device, an input for sending a message; determining, based on a group identifier associated with a recipient group, that the message is to be addressed to the submission group; determining, based on an identifier of the submission group, the submission public key for the submission group; and encrypting the message using the submission public key for transmission to a server.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A system for providing end-to-end message encryption for submission groups, the system comprising:

one or more processors; and a non-transitory, computer-readable storage medium storing instructions, which when executed by the one or more processors cause the one or more processors to:

receive, at a server from a client device associated with a user, an encrypted message addressed to a user group, wherein the user group comprises a plurality of members;

determine, based on an identifier of the user group received with the encrypted message, that the user group is a submission group where administrators of the submission group receive each message without other members of the user group receiving each message;

based on determining that the user group is the submission group, retrieve, from a data structure storing member identifiers of the plurality of members of the user group, a plurality of administrator identifiers corresponding to a plurality of administrators of the user group, wherein the plurality of administrators of the user group is a subset of the plurality of members of the user group;

determine, based on the plurality of administrator identifiers, a plurality of administrator devices associated with the plurality of administrators; and transmit the encrypted message to the plurality of administrator devices without transmitting the encrypted message to the other members of the user group, wherein each device of the plurality of administrator devices stores a binary tree associated with the user group together with a private key derived from a submission secret, and wherein each device of the plurality of administrator devices decrypts the encrypted message using the private key.

2. The system of claim 1, wherein the instructions further cause the one or more processors to:

receive an indication that the user of the submission group is to be elevated to an administrator;

identify an entry associated with the user within the data structure storing the member identifiers of the plurality of members of the user group;

add a flag to the entry associated with the user;

generate an initial secret for a group update of the submission group; and transmit to the plurality of administrator devices within the user group a command to update the user group, wherein the command comprises the indication of the user.

3. The system of claim 1, wherein the instructions further cause the one or more processors to:

receive a request to transform a first group into a first submission group;

generate a group secret, wherein the group secret is used to generate a private key and a public key for the first submission group;

determine a plurality of group administrators associated with the first group;

retrieve a plurality of identifiers for a plurality of devices associated with the plurality of group administrators of the first group; and transmit to each device of the plurality of devices a command to update the first group into the first submission group using the group secret.

4. The system of claim 1, wherein the instructions for determining whether the user group is the submission group further cause the one or more processors to:

generate a group lookup request, wherein the group lookup request comprises a group identifier;

receive a group entry in response to the group lookup request; and determine whether the group entry comprises a submission group flag.

5. The system of claim 1, wherein the instructions further cause the one or more processors to:

determine whether the user that sent the encrypted message is a member of the submission group; and based on determining that the user that sent the encrypted message is not the member of the submission group, refrain from sending the encrypted message to the plurality of administrators of the submission group.

6. The system of claim 5, wherein the instructions further cause the one or more processors to, based on determining that the user that sent the encrypted message is a non-member of the submission group, flag the encrypted message to indicate that the encrypted message was sent by the non-member.

7. A method for creating submission groups, the method comprising:

receiving, at a client device, a request to generate a submission group, wherein the submission group is a group where administrators of the group receive each message without other members of the submission group receiving each message;

determining a plurality of administrators for the submission group;

based on determining the plurality of administrators, causing a data structure to be generated for the submission group, wherein the data structure comprises a plurality of entries for the plurality of administrators with each entry corresponding to an administrator comprising an administrator flag;

generating, based on the data structure, a binary tree for the submission group, wherein the binary tree comprises (1) a plurality of administrator identifiers of the plurality of administrators within the submission group and (2) a plurality of key generation secrets, wherein each key generation secret of the plurality of key generation secrets is a last generated key generation secret for a corresponding administrator;

deriving, from a master secret, a submission secret for the submission group, wherein the submission secret is used to derive a submission public key for encrypting submission group messages and a submission private key for decrypting submission messages; and transmitting, to each administrator device, the submission secret for generating the submission public key and the submission private key.

8. The method of claim 7, further comprising:

receiving an encrypted message;

determining, based on metadata received with the encrypted message, that the encrypted message is addressed to the submission group;

determining, based on an identifier of the submission group, the submission private key for the submission group; and decrypting the encrypted message using the submission private key.

9. The method of claim 7, wherein determining the plurality of administrators for the submission group comprises receiving corresponding node data for a plurality of nodes that is to be generated for the binary tree wherein each node is associated with the corresponding administrator.

10. The method of claim 7, further comprising:

receiving, from a user operating the client device, an input for sending a message;

determining, based on a group identifier associated with a recipient group, that the message is to be addressed to the submission group;

determining, based on an identifier of the submission group, the submission public key for the submission group; and encrypting the message using the submission public key for transmission to a server.

11. One or more non-transitory, computer-readable storage media storing instructions thereon, which when executed by one or more processors cause the one or more processors to:

receive an encrypted message addressed to a user group, wherein the user group comprises a plurality of members;

determine, based on an identifier of the user group received with the encrypted message, whether the user group is a submission group where administrators of the submission group receive each message without other members of the submission group receiving each message;

based on determining that the user group is the submission group, retrieve a plurality of administrator identifiers corresponding to a plurality of administrators of the user group;

determine, based on the plurality of administrator identifiers, a plurality of administrator devices associated with the plurality of administrators; and transmit the encrypted message to the plurality of administrator devices without transmitting the encrypted message to the other members of the user group, wherein each device of the plurality of administrator devices stores a binary tree associated with the user group and a submission secret for the user group, and wherein each device of the plurality of administrator devices decrypts the encrypted message using a private key derived using the submission secret.

12. The one or more non-transitory, computer-readable storage media of claim 11, wherein the encrypted message is received at a server from a client device associated with a user, and wherein the user is a member of the user group with the user group.

13. The one or more non-transitory, computer-readable storage media of claim 11, wherein the plurality of administrator identifiers is retrieved from a data structure storing member identifiers of the plurality of members of the user group, and wherein the plurality of administrators of the user group is a subset of the plurality of members of the user group.

14. The one or more non-transitory, computer-readable storage media of claim 11, wherein the instructions further cause the one or more processors to:

receive an indication that a first user of a first group is to be elevated to a group administrator;

identify an entry associated with the first user within a data structure storing member identifiers of the plurality of members of the first group;

add an administrator flag to the entry associated with the first user;

generate an initial secret for a group update and a new submission secret; and transmit to the plurality of administrator devices within the first group a command to update the first group, wherein the command comprises the indication of the first user and the initial secret with the new submission secret.

15. The one or more non-transitory, computer-readable storage media of claim 11, wherein the instructions further cause the one or more processors to:

receive a request to transform a second group into the submission group;

generate a submission secret, wherein the submission secret is used to generate a private key and a public key;

determine a second plurality of administrators associated with the second group;

retrieve a plurality of identifiers for a plurality of devices associated with the second plurality of administrators; and transmit, to each device of the plurality of devices, a command to update the second group into the submission group using the submission secret.

16. The one or more non-transitory, computer-readable storage media of claim 11, where in the instructions further cause the one or more processors to:

generate a group lookup request, wherein the group lookup request comprises a group identifier;

receive a group entry in response to the group lookup request; and determine whether the group entry comprises a submission group flag.

17. The one or more non-transitory, computer-readable storage media of claim 11, where in the instructions further cause the one or more processors to:

determine whether the encrypted message was sent by a member of the submission group; and based on determining that the encrypted message was not sent by the member of the submission group, refrain from sending the encrypted message to the plurality of administrators of the submission group.

18. The one or more non-transitory, computer-readable storage media of claim 17, wherein the instructions further cause the one or more processors to, based on determining that the encrypted message was sent by a non-member of the submission group, flag the encrypted message to indicate that the encrypted message was sent by the non-member.

* * * * *